United States Patent Office 2,773,392
Patented Dec. 11, 1956

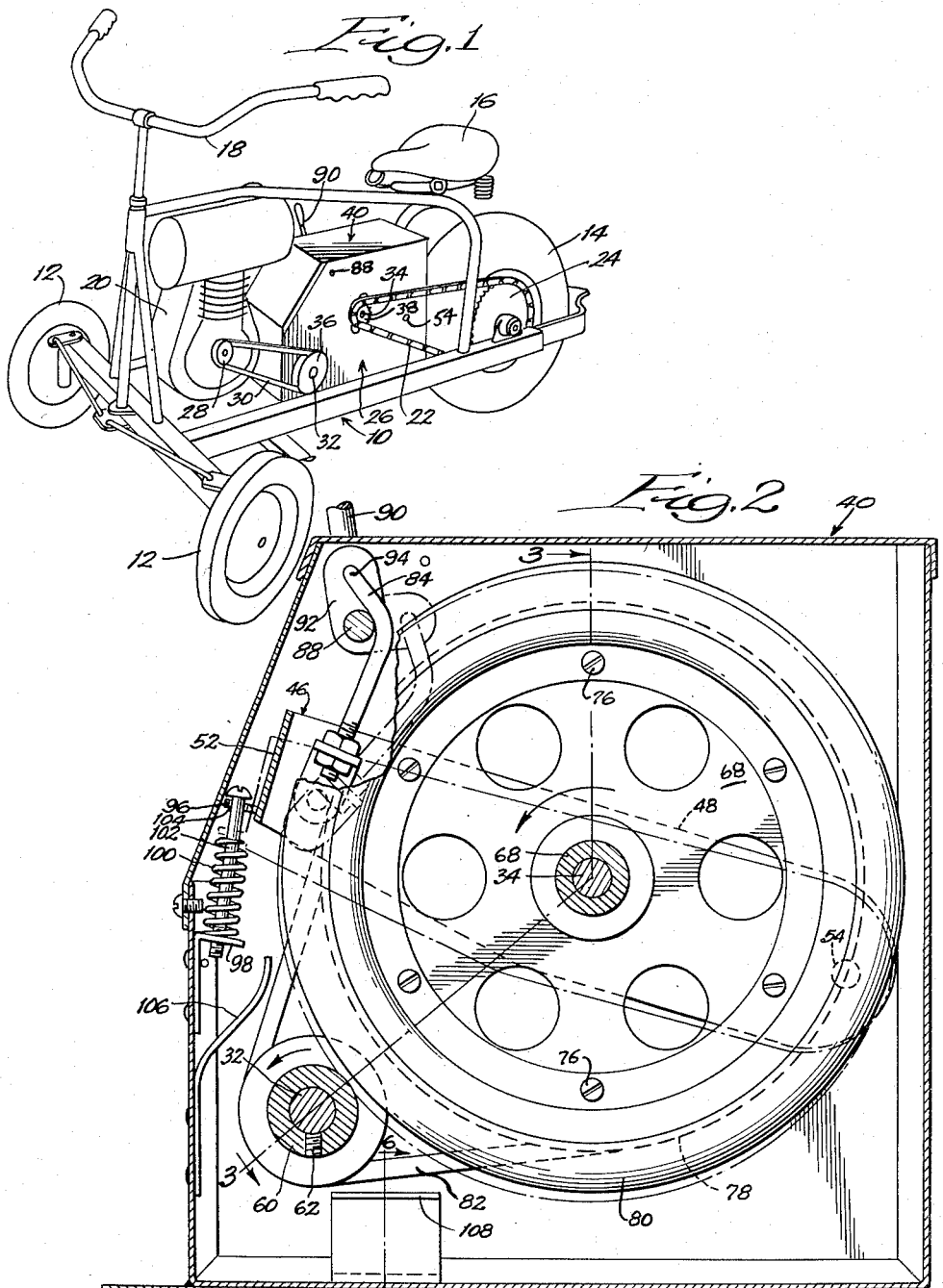

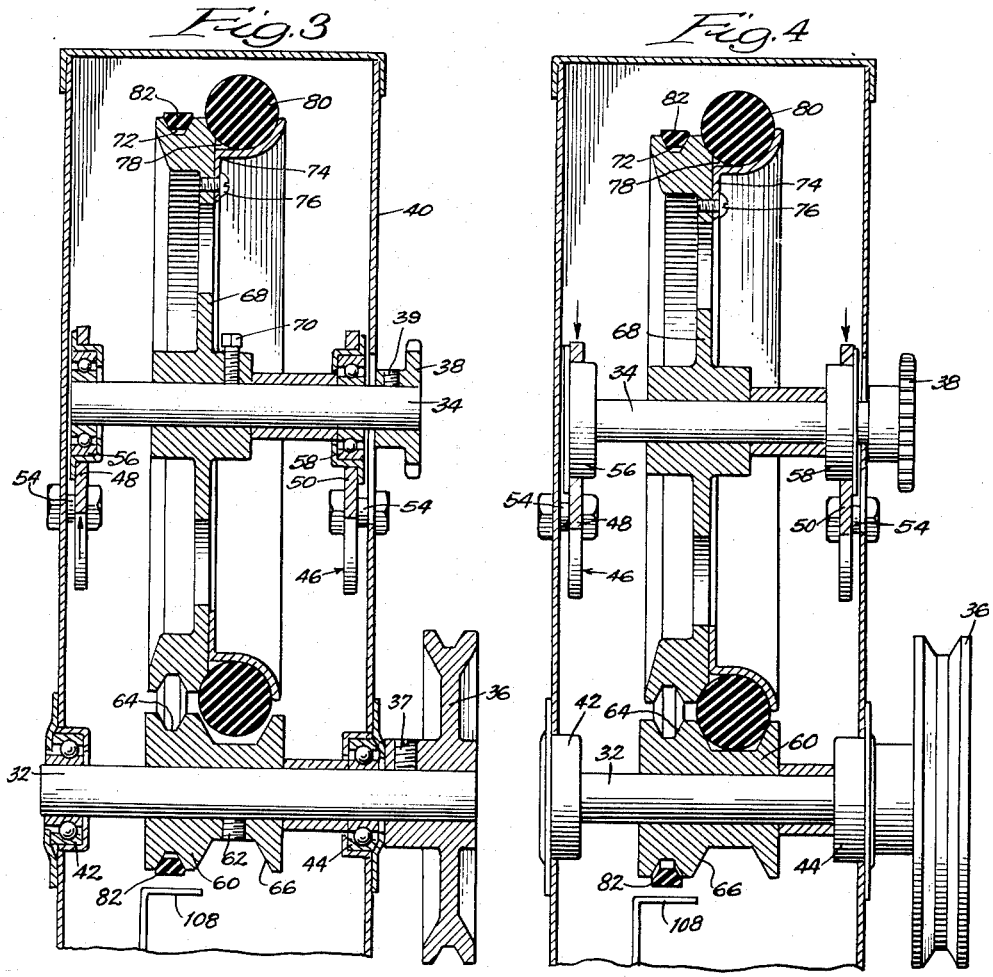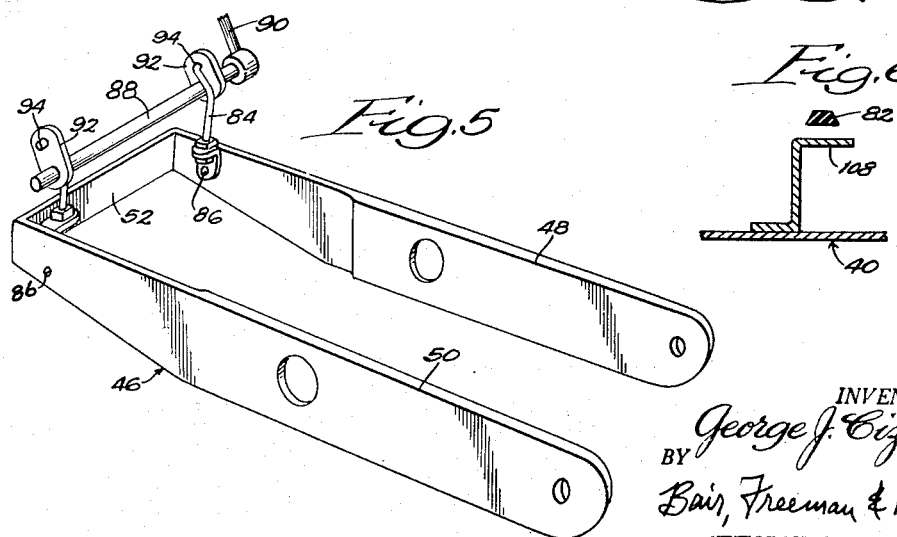

2,773,392

POWER TRANSMISSION

George J. Cizek, Clutier, Iowa

Application June 29, 1953, Serial No. 364,669

6 Claims. (Cl. 74—203)

This invention relates to a transmission and more particularly to a friction-drive type transmission which is particularly useful with small vehicles.

An object of this invention is to provide a novel and simplified transmission for use with small vehicles of the type which may be driven by an internal combustion engine.

Another object of this invention is to provide a transmission for use with internal combustion type power means, which transmission combines therein a clutch, whereby the necessity of a clutch separate from the transmission is obviated.

A further object of this invention is to provide a novel transmission with a three-position control, wherein one control position is for forward, another control position is for reverse, and the third control position is neutral.

Still another object of this invention is to provide a transmission with a three-position control, wherein one control position is for forward, another control position is for reverse, and the third control position is neutral, and wherein said control is provided with means for locking said control in the forward speed position, and said control further provides means for unlocking said control and for maintaining the transmission in neutral.

Still another object of this invention is to provide a transmission that achieves all of the above set forth objects and is further characterized by its simplicity, sturdiness of construction, and ease and efficiency of operation.

Still a further object of this invention is to provide a power transmission that is of unusual light weight, sturdiness, and compactness.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a perspective view of a small vehicle driven by an internal combustion engine provided with the novel and improved transmission of this invention;

Figure 2 is a side elevation of the transmission showing in full lines one position of the transmission elements and control therefor, in which position the transmission is delivering power, and showing in dashed lines a second position of the transmission elements and control therefor, in which second position the transmission is in neutral;

Figure 3 is a cross-section view taken substantially on line 3—3 of Figure 2 and shows the transmission elements in one power delivering position, within which position the input and the output shafts of the transmission are rotated in the same direction;

Figure 4 is a view similar to Figure 3 showing the transmission elements in another power delivering position, within which position the input and the output shafts are rotated in opposite directions;

Figure 5 is a perspective view of the U-shaped bracket, or saddle element, which carries the output shaft of the transmission; and Figure 6 is a fragmentary cross-section view taken on line 6—6 of Figure 2.

Referring now to the drawings, there is shown in Figure 1 a typical small vehicle that is equipped with the novel transmission which constitutes this invention. The vehicle, generally indicated at 10, is wheel mounted and has front wheels 12 and a rear drive wheel 14. The vehicle provides a seat 16 for the operator, and handlebars 18 may be provided for steering the vehicle. The vehicle may be powered by any appropriate means, such as the internal combustion engine 20, which is shown in the illustration as a single cylinder engine mounted on the forward portion of the frame of vehicle 10. The vehicle's drive wheel 14 is adapted to be driven by means of a chain 22 and a sprocket 24.

To transmit the power from the engine 20 to the drive wheel 14 by means of drive chain 22, there is provided a transmission generally indicated at 26. The transmission 26 is mounted on the frame between the internal combustion engine 20 and the vehicle's drive wheel 14. The engine has a drive sprocket or pulley 28 over which passes a continuous power transmitting element 30, such as a chain or belt. The particular power transmitting element 30 shown is a V-belt. The transmission 26 is provided with an input shaft 32 and an output shaft 34. The input shaft 32 has a pulley 36 mounted thereon, and secured thereto by means of a set-screw 37, adapted to be driven by the V-belt 30 that is trained thereover. The output shaft 34 has a sprocket 38 mounted thereon, and secured thereto by means of set-screw 39, adapted to drive the chain 22 which is trained thereover.

Referring now specifically to the construction of the transmission 26, reference is had particularly to Figures 2, 3, and 4. The transmission 26 includes a frame 40 which is in the form of a substantially totally enclosed box-like housing, surrounding the cooperating elements of the transmission.

The input shaft 32 is journaled in the walls of the housing, or frame, 40 by means of bearings 42 and 44. There is provided within the housing 40 a U-shaped bracket, or saddle member, generally indicated at 46. This U-shaped bracket 46 is best shown in Figure 5. The U-shaped bracket has a pair of parallel legs 48 and 50 and a bight 52. The extending ends of legs 48 and 50 are journaled on frame 40 by means of opposed pins 54, the pivot axis of said pins 54 lying parallel to the axis of input shaft 32.

The output shaft 34 is journaled in bearings 56 and 58 which are supported, respectively, on legs 48 and 50 intermediate the ends thereof. The bearings 56 and 58 are aligned so that the axis of output shaft 34 is parallel with the axis of input shaft 32. The U-shaped bracket 46 is so positioned within housing 40 that the axis of output shaft 34 is offset from the plane which passes through the axis of input shaft 32 and the axis of the pivot pins 54. Thus, when the U-shaped bracket 46 is pivoted about pins 54, the axis of output shaft 34 moves, in relation to the axis of input shaft 32, toward and away from the axis of input shaft 32.

The input shaft 32 has a first pulley member 60 mounted thereon and secured thereto by means of a set-screw 62. This pulley member 60 has two V-notches therein which are laterally spaced from each other. The first V-notch 64 is much smaller than the second V-notch 66 for a purpose which will become apparent as the description proceeds.

A second pulley 68 is mounted on output shaft 34 and is secured thereto by means of set-screw 70. Pulley 68 is of much greater diameter than pulley 60 for the purpose of obtaining lower output speeds from the output shaft 34 as compared with the speed of the input shaft 32.

The pulley 68 has a V-notch 72 formed in the periphery thereof and aligned in the same plane with the V-notch 64 in pulley 60. The cross-sectional dimension of V-notch 72 is substantially the same as the cross-section of V-notch 64. The pulley 68 further has attached thereto an annular member 74. The annular member is detachably mounted on pulley 68 by an appropriate means, such as screws 76. The annular member 74 and the adjacent side of pulley 68 define between themselves an annular recess 78 within which is positioned a friction drive member 80. This friction drive member is formed of a resilient material and may be a solid rubber tire or the like. When the tire 80 is assembled on pulley 68, the pulley 68 gives the appearance of having an annular friction annulus thereon extending outwardly of the periphery of the pulley 68. The annular friction member 80 is positioned in the same plane as the V-notch 66 in the pulley member 60.

Surrounding the pair of spaced pulleys 60 and 68 is a flexible continuous member, such as V-belt 82, which is positioned in the plane of the aligned V-notches 64 and 72. The V-belt 82 is adapted to connect the shafts 32 and 34 in driving relation with each other when the shafts are swung away from each other sufficiently for the V-belt 82 to frictionally engage the walls of the V-notches 64 and 72 to cause driving engagement between the V-belt and the pulleys 60 and 68.

When the output shaft 34 is swung toward the input shaft 32 sufficiently so that the rubber tire 80 enters the V-groove 66 and frictionally engages the walls thereof as shown in Figure 4, then the rubber tire 80 engages the walls of V-notch 66 in driving relation, so as to cause the input and the output shafts to rotate in opposite directions.

Referring now to the control by means of which the movement of the output shaft 34 toward and away from input shaft 32 is achieved, there is included in the control, and shown in Figures 2 and 5, a pair of toggle links 84 which are pivotable at one end thereof about pins 86 secured to the U-shaped bracket 46 adjacent the bight 52 of the bracket 46. A control shaft 88 is journaled in frame, or housing, 40 and is adapted to be rocked about its axis. A manual control 90 secured to one end of control shaft 88 is provided for rocking the control shaft 88. The control shaft 88 has a pair of intermediate links 92 secured thereto; and the toggle links 84 are pivotally connected to these links 92 at 94.

The pivot axis of pins 86 and the axis of pivot connections 94 are so related with the axis of control shaft 88 that when the plane through the pivot axes of pins 86 and pivot connections 94 is positioned to one side of the axis of control shaft 88 then the control is in a locked position and when said plane is positioned on another side of the axis of the control shaft 88, the control is unlocked.

As can be seen in Figure 2, the locking position of the control is obtained when the pulleys 60 and 68 are interconnected in driving relation by means of V-belt 82 or when the input and the output shafts are rotating in the same direction. This is the forward speed position. When the control is swung to an unlocked position, the force of gravity biases the U-shaped bracket 46 and the output shaft 34 carried thereby downwardly. Sufficient movement is provided so that the V-belt 82 is disconnected from the driving relation when the control is unlocked and is controlled by gravity.

When the control is unlocked and gravity is biasing the U-shaped bracket 46 downwardly, it is desirable that the U-shaped bracket 46 and the transmission elements be maintained in the neutral position. To insure this result, the bracket is provided with a flange 96 which is aligned with another flange 98 carried by the frame 40. A coil spring 100 is positioned between these aligned flanges and upon the bracket falling a predetermined distance, the spring is operative to bias the aligned flanges 96 and 98 apart in a position where there is no driving relation between the input shaft 32 and the output shaft 34.

The bracket 98 also carries a threaded bolt 102, the shank of which extends through an aperture 104 in bracket 96. This bolt 102 passes concentrically through the coil spring 100; and the cooperation of bolt 102 and flange 96 serves to prevent misalignment of the U-shaped bracket 46 within the frame.

When the U-shaped bracket 46 is in the neutral position, it is necessary to force the bracket downwardly against the bias of coil spring 100 in order to force the rubber tire 80 into frictional engagement with the walls of V-notch 66 to obtain driving relation between the input shaft 32 and the output shaft 34 for causing opposite rotation of said shafts. This latter control is obtained through the manipulation of control handle 90 by means of which control shaft 88 may be rocked and causing toggle links 84 to transmit the force for moving the U-shaped bracket 46 downwardly against the bias of coil spring 100 to obtain such driving relation.

When the V-belt 82 is out of driving relation with the V-notches 64 and 72, there is occasionally a tendency of the V-belt 82 to get out of alignment with said V-notches. Accordingly, guards are provided for preventing the V-belt 82 from becoming misaligned with the V-notches 64 and 72. A first guard 106 and a second guard 108 are provided for this purpose. These guards 106 and 108 are aligned substantially in the same plane with said flexible continuous members 82 and said V-notches 64 and 72. These guards further are positioned to engage the portion of the V-belt which extends tangentially between the pulleys 60 and 68, as clearly seen in Figure 2.

The operation of this transmission will be understood from the above description and it will be understood that the transmission that has been provided permits locking of the input and the output shafts in a first position at which forward speeds are obtained, and which permits unlocking of the control to move the shafts to a position where they are neutral, and provides manual means for forcing the shafts toward each other so as to obtain reverse-output torque from the transmission. The entire arrangement is very simple, compact and sturdy and the entire transmission is very light and simple to operate.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. In a transmission, a frame, an input shaft supported by said frame, an output shaft supported by said frame, said shafts being movable toward and away from each other over a range of spacings, there being a first spacing at which a first driving means interconnects said shafts in a first driving relation, there being a second spacing of said shafts, smaller than said first spacing, at which a second driving means interconnects said shafts in a second driving relation, there being a third spacing of said shafts, intermediate said first and second spacings, where there is no driving interconnection between said shafts, one of said driving means being operative to cause said shafts to rotate in the same directions and the other said driving means being operative to cause said shafts to rotate in opposite directions, means including a toggle linkage for maintaining said shafts at said first spaced relation, means including a single spring so positioned and arranged and gravity operating opposite to said spring for maintaining said shafts at said third spacing, and means including a control member for overcoming the bias of said spring to adjust the spacing of said shafts to said second spacing.

2. In a transmission, a frame, an input shaft and an output shaft supported by said frame, a first pulley member on said first shaft having at least two V-notches in the periphery thereof, said second shaft having a second pulley member thereon of greater diameter than the pulley member on the first shaft, a resilient annulus carried by said second pulley member and aligned substantially in the same plane with one of the V-notches in the first pulley member, a V-notch in the second pulley member aligned substantially in the same plane with the second V-notch on the first pulley member, a V-belt trained through the aligned V-notches of the first and second pulley members, said first and second shafts being movable toward and away from each other to selectively obtain a driving connection between said shafts by means of said V-belt when said shafts are biased away from each other, and to obtain a driving connection between said shafts by means of said resilient annulus when the shafts are biased toward each other, and a guard carried by said frame and aligned substantially in the plane of the registering V-grooves and V-belt, said guard being positioned to cooperate with said V-belt to prevent the V-belt from slipping out of the V-grooves when the V-belt is disconnected from driving engagement with the pulleys.

3. In a transmission, a frame, an input shaft and an output shaft supported by said frame, a first pulley member on said first shaft having at least two V-notches in the periphery thereof, said second shaft having a second pulley member thereon of greater diameter than the pulley member on the first shaft, a resilient annulus carried by said second pulley member and aligned substantially in the same plane with one of the V-notches in the first pulley member, a V-notch in the second pulley member aligned substantially in the same plane with the second V-notch on the first pulley member, a V-belt trained through the aligned V-notches of the first and second pulley members, said first and second shafts being movable toward and away from each other to selectively obtain a driving connection between said shafts by means of said V-belt when said shafts are biased away from each other, and to obtain a driving connection between said shafts by means of said resilient annulus when the shafts are biased toward each other, and a guard carried by said frame and aligned substantially in the plane of the registering V-grooves and V-belt, said guard being positioned to cooperate with said V-belt to prevent the V-belt from slipping out of the V-grooves when the V-belt is disconnected from driving engagement with the pulleys, said guard being positioned to engage a portion of the V-belt which extends tangentially between both pulleys.

4. In a transmission, a frame, a first shaft journaled in said frame, a U-shaped bracket pivotally mounted on the frame adjacent the extended ends of the legs of the U on an axis parallel to the axis of said first shaft, a second shaft parallel to said first shaft journaled on said U bracket between the legs thereof and between the ends of the legs of the U and the bight of the U, means connected to the U-shaped bracket between the second shaft and the bight of the U for pivoting said U-shaped bracket so that the second shaft may be swung toward and away from the first shaft over a range of spacings, there being a first spacing at which a first means interconnects said first and second shafts in a first driving relation, there being a second spacing of said shafts, smaller than said first spacing, at which a second means interconnects said shafts in a second driving relation, there being a third spacing of said shafts, intermediate said first and second spacings, where there is no driving connection between said shafts, one of said driving means being operative to cause said shafts to rotate in the same direction and the other said driving means being operative to cause said shafts to rotate in opposite directions, an apertured flange carried by the bight of the U-shaped bracket and extending outwardly thereof, an elongated member mounted on the frame and passing through said aperture in said flange, said elongated member and flange cooperating to maintain the alignment of the U-shaped bracket as it is swung to various selected positions, and a single coil spring concentric with said elongated member and providing resilient means between said U-shaped bracket and the frame for maintaining said U-shaped bracket in said position where the drive shafts are disconnected.

5. In a transmission, a frame, a first shaft journaled in said frame, a U-shaped bracket pivotally mounted on said frame adjacent the extended ends of the legs of the U about an axis parallel to the axis of said first shaft, a second shaft parallel to said first shaft journaled on said U-shaped bracket between the legs thereof and between the ends of the legs of the U and the bight of the U, the axis of said second shaft being offset from a plane through the axis of the first shaft and said pivot axis of said U-shaped bracket, said first shaft having a first pulley member thereon, said second shaft having a second pulley member thereon, each of said pulleys having at least two axially spaced means thereon adapted for driving engagement and aligned with the axially spaced means on the other pulley adapted for driving engagement, at least one of said means on said two pulleys comprising a friction annulus extending outwardly of the periphery of the pulley member on which it is mounted, a flexible continuous member surrounding the pair of pulleys and adapted, upon said pulleys being moved apart, to drivingly engage some of said means on said pulleys to connect said pulleys in driving relation, a toggle link pivotally connected at one end thereof to said U-shaped bracket between the bight of the U and said second shaft supported by the U-shaped bracket, a control supported on said frame and pivotable about an axis parallel to the axis of the pivotal connection of said toggle link to said U-shaped bracket, said toggle link being pivotally secured to said control, a member operatively associated with said control for swinging the toggle link selectively to a locking position and to an unlocked position, the spacing of said first and second shafts, when said toggle link is in said locking position, being such that said flexible continuous member is operative to interconnect said shafts in a first driving relation, said U-shaped bracket being swung by gravity, when said toggle link is in an unlocked position, away from said position where said flexible continuous member operatively interconnects said first and second shafts, a single spring positioned between a portion of said frame and a flange on the bight of said U-shaped bracket and engageable therewith, said spring being operative, upon said U-shaped bracket being swung by gravity, to position said U-shaped bracket so that the spacing between the first and second shafts renders said shafts operatively disconnected, and selectively operable means including said control and toggle link for biasing said U-shaped bracket against the bias of said spring to a position where said resilient friction annulus is operative to interconnect said first and second shafts in a second driving relation.

6. A transmission as set forth in claim 5 including a guard carried by said frame and aligned substantially in the plane of said flexible continuous member for preventing said flexible continuous member from slipping out of alignment with the means on the pulleys adapted to be drivingly engaged by said flexible continuous member, when the flexible continuous member is disconnected from driving engagement with said pulleys.

References Cited in the file of this patent
UNITED STATES PATENTS

| | | |
|---|---|---|
| 812,823 | Clay | Feb. 20, 1906 |
| 2,224,309 | Mack | Dec. 10, 1940 |
| 2,495,518 | Gibbs | Jan. 24, 1950 |
| 2,654,260 | Lewis | Oct. 6, 1953 |